(12) United States Patent
Huang et al.

(10) Patent No.: US 8,112,644 B2
(45) Date of Patent: Feb. 7, 2012

(54) DYNAMIC VOLTAGE SCALING SCHEDULING MECHANISM FOR SPORADIC, HARD REAL-TIME TASKS WITH RESOURCE SHARING

(75) Inventors: Chih-Hsiang Huang, Taiping (TW); Jeng-Wei Lee, Fongshan (TW); Mong-Fong Horng, Kaohsiung (TW); Yau-Hwang Kuo, Tainan (TW); Pau-Choo Chung, Tainan (TW); Lan Chang, Taipei (TW); Jen-Wei Hu, Sinshih Township, Tainan County (TW)

(73) Assignee: Institute for Information Industry, Taipei (TW)

( * ) Notice: Subject to any disclaimer, the term of this patent is extended or adjusted under 35 U.S.C. 154(b) by 1125 days.

(21) Appl. No.: 11/979,780

(22) Filed: Nov. 8, 2007

(65) Prior Publication Data

US 2008/0148273 A1    Jun. 19, 2008

(30) Foreign Application Priority Data

Dec. 15, 2006   (TW) ............................... 95147265 A

(51) Int. Cl.
*G06F 1/26* (2006.01)
*G06F 1/32* (2006.01)

(52) U.S. Cl. ......... 713/320; 713/300; 718/100; 718/102
(58) Field of Classification Search .................. 713/300, 713/320; 718/100, 102
See application file for complete search history.

(56) References Cited

U.S. PATENT DOCUMENTS

| | | | |
|---|---|---|---|
| 6,519,707 B2* | 2/2003 | Clark et al. ................... 713/322 |
| 6,986,068 B2* | 1/2006 | Togawa ......................... 713/320 |
| 7,174,468 B2* | 2/2007 | Gary et al. ..................... 713/300 |
| 7,328,073 B2* | 2/2008 | Dolwin ............................ 700/11 |
| 7,418,358 B2* | 8/2008 | Dolwin ............................. 702/78 |
| 7,685,446 B2* | 3/2010 | Hong et al. ................... 713/320 |
| 2004/0025069 A1* | 2/2004 | Gary et al. ..................... 713/300 |
| 2007/0204179 A1* | 8/2007 | Qiu et al. ....................... 713/320 |
| 2007/0245317 A1* | 10/2007 | Hong et al. ................... 717/130 |

OTHER PUBLICATIONS

A Dynamic Voltage Scaling Algorithm for Sporadic Tasks, Ala' Qadi et al., Proceedings of the 24th IEEE International Real-Time Systems Symposium (RTSS'03), 2003.
Energy Aware Task Scheduling with Task Synchronization for Embedded Real-Time Systems, Ravindra Jejurikar, IEEE Transactions on Computer Aided Design of Integrated Circuits and Systems, vol. X, No. XX, Month 200X.
Scheduling Sporadic Tasks with Shared Resources in Hard-Real-Time Systems, Kevin Jeffay, Proceedings of the 13th IEEE Real-Time Systems Symposium, Phoenix, AZ, Dec. 1992, pp. 89-99.

* cited by examiner

*Primary Examiner* — Thomas Lee
*Assistant Examiner* — Jaweed A Abbaszadeh
(74) *Attorney, Agent, or Firm* — Rabin & Berdo, P.C.

(57) ABSTRACT

A dynamic voltage scaling scheduling method executes one of the steps. When one task in the delayed task set requires for being executed, a working voltage required for executing the task is increased, and the task is removed from the delayed task set; when one task in the delayed task set requires for sharing resources, the working voltage required by the task is set as the current working voltage or a larger one in the minimum upper bounds of all the works requiring for sharing resources; and when one task does not belong to the delayed task set, but the waiting time has exceeded the period of the work, the working voltage for executing the task is reduced, and the task is added in the delayed task set.

18 Claims, 5 Drawing Sheets

DYNAMIC VOLTAGE SCALING SCHEDULING MECHANISM FOR SPORADIC, HARD REAL-TIME TASKS WITH RESOURCE SHARING

This non-provisional application claims priority under 35 U.S.C. §119(a) on Patent Application No(s). 095147265 filed in Taiwan, R.O.C. on Dec. 15, 2006, the entire contents of which are hereby incorporated by reference.

BACKGROUND OF THE INVENTION

1. Field of Invention

The present invention relates to a task scheduling method, and more particularly, to a dynamic voltage scaling scheduling method for sporadic and hard real-time tasks with resource sharing.

2. Related Art

An embedded system is a device for controlling, monitoring, or assisting the operation of an apparatus, a machine, or even a factory, which is a combination tightly integrated with computer software and hardware. In newly-emerged embedded system products, the most common ones include mobile phone, PDA, GPS, Set-Top-Box, embedded server, and thin client.

The embedded system has a lot of differences with the desktop computer system, and the microprocessor of most embedded systems is developed in manner of SoC. As for the flow of developing software, the software of the embedded system always exists in form of a firmware, therefore, the development in terms of software is also different from the development of desktop computer programs, and it is very common for the development of embedded system to develop software and hardware at the same time.

Most of the current embedded systems are developing towards the trend of being mobile, networked, and automatic. Since the executed software modules always have the real-time requirement and are limited by the electric power, how to achieve the real-time task scheduling that meets the highest energy-saving requirement has always been an important key technique in the real-time operating system used in the current embedded system.

In the currently existed techniques, multitasking scheduling is mostly achieved with fixed voltage and time division, or the energy-saving objective is achieved by way of static voltage scaling through using multilevel voltage scaling. The tasks are designated with different priority levels, the processing time is allocated according to the priority levels, and thus the tasks with different priority levels can obtain different processor time and different executing order. On the other hand, the energy-saving objective is achieved by setting different executing voltages according to different power supply states and task requirements. The current mechanism has an easy implementation manner, and does have the energy-saving effect, however, it can only be applied in a common computer architecture with several and discrete voltage levels, but cannot guarantee to meet the hard real-time requirement, thus it has a very limited performance in terms of energy-saving. In addition, when there are sporadic and resource-sharing tasks, it is hard to meet the hard real-time requirement.

Moreover, when considering the scheduling of a task set, the dependence between different tasks must be taken into consideration, for example, the accessing of the software resources for different tasks, so as to avoid excessive context switch, which consumes excessive electrical power.

SUMMARY OF THE INVENTION

Accordingly, the present invention is directed to provide a dynamic voltage scaling scheduling method, which calculates a feasible minimum voltage according to the deadline required by the task and software resource utilization, so as to dynamically adjust the scheduling.

The dynamic voltage scaling scheduling method according to an embodiment of the present invention is used for scheduling tasks in a delayed task set, wherein a property of a task is determined first, and when the task belongs to the delayed task set or the task does not belong to the task collection but the waiting time has exceeded a period of the task, one of the following steps is executed. When one task in the delayed task set requires for being executed, a working voltage required for executing the task is increased, the task is removed from the delayed task set, and the method returns to the step of determining the property of the task. When one task in the delayed task set requires for sharing resources, the working voltage required by the task is set as a current working voltage or a larger one in least upper bounds of all the tasks requiring for sharing resources, and the method returns to the step of determining the property of the task. When one task not belonging to the delayed task set exists, and the waiting time of the task has exceeded the period of the task, the working voltage required for executing the task is reduced, the task is added in the delayed task set, and the method returns to the step of determining the property of the task.

The dynamic voltage scaling scheduling method according to the present invention meets the requirements of hard real-time. Thus, it will serve as a software component to be responsible for the scheduling of hard real-time tasks including periodic, non-periodic, and sporadic tasks, and further improves energy efficiency, such that it is more applicable to an embedded system.

The dynamic voltage scaling scheduling method according to the present invention comprises periodically calculating an optimum start/end time and a minimum executing voltage of the scheduling of the tasks in real-time according to the property of the task to be executed, thereby achieving the real-time and energy saving requirements. The factor of software-resources sharing is also taken into consideration during the scheduling, such that the scheduling of the task has more flexibility.

The above description relevant to the content of the present invention and the following description of the embodiments are used to exemplify and explain the spirit and principle of the present invention, and provide a further explanation of the claims of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The detailed features and advantages of the present invention are described in detail in the following embodiments, which is sufficient for any skilled in the art to understand the technical content of the present invention and implement accordingly. Any skilled in the art can easily understand the objectives and advantages of the present invention from the content disclosed in the detailed description, claims, and drawings.

Figure 1:
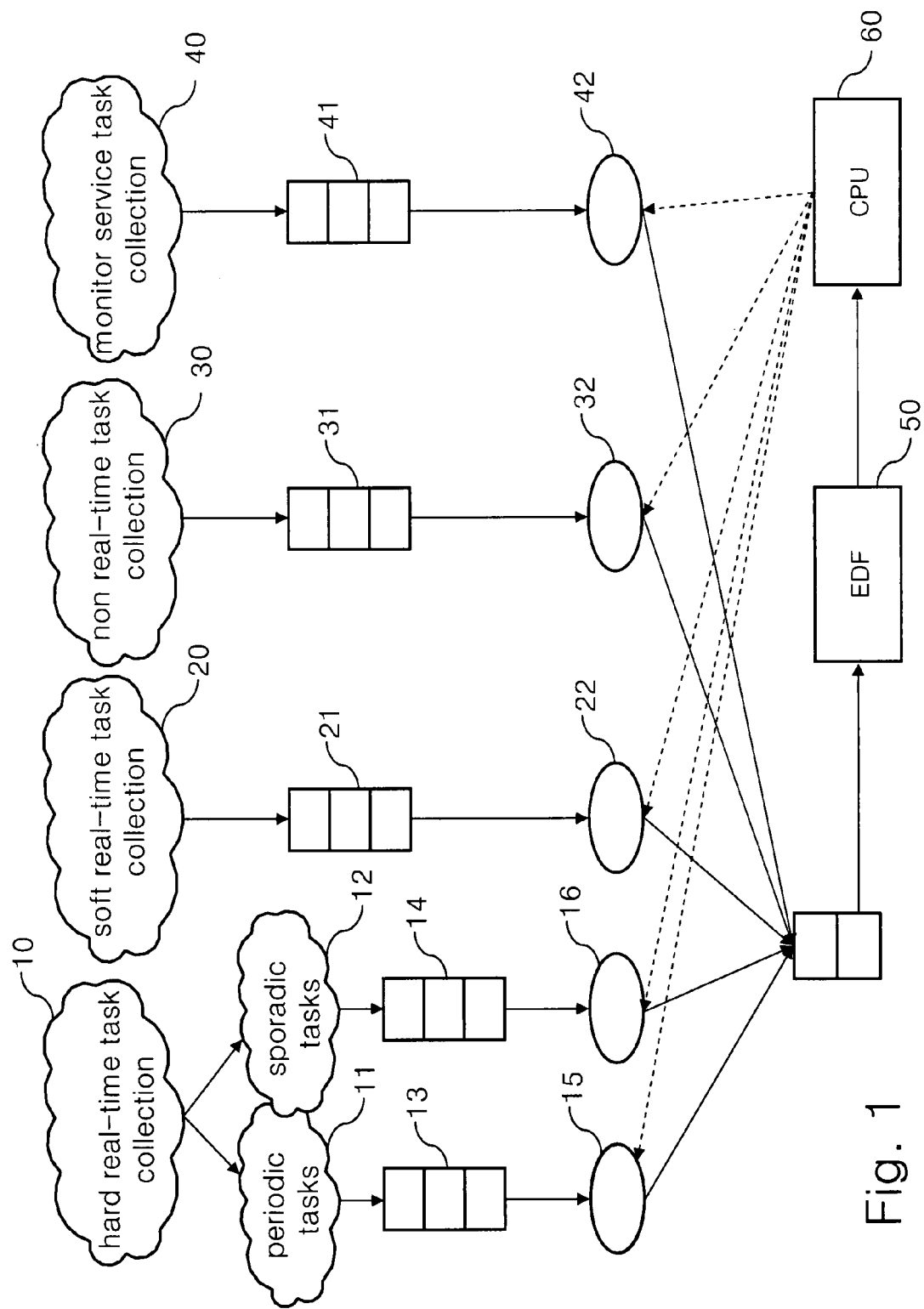
FIG. 1 is a schematic view of a scheduling process for the dynamic voltage scaling scheduling method according to the present invention.

Referring to FIG. 1, it is a schematic view of a scheduling architecture applicable for the dynamic voltage scaling scheduling method according to the present invention.

Generally, tasks may be classified into four types, namely, hard real-time tasks, soft real-time tasks, non real-time tasks, and monitor service tasks. During the scheduling process, the tasks are categorized into four task collections, i.e., a hard real-time task collection 10, a soft real-time task collection 20, a non real-time task collection 30, and a monitor service task collection 40. The hard real-time task collection 10 is divided into periodic tasks 11 and sporadic tasks 12 according to the occurring time. Each type of tasks has an exclusive queue 13, 14, 21, 31, 41 for the tasks to wait. The service time of each task is ensured by a constant bandwidth service (CBS) 15, 16, 17, 22, 32, 42. All the CBSs are served by an Early Deadline First (EDF) scheduler 50, and the bandwidth (calculation capability) of a central processing unit (CPU) 60 is distributed to all the CBSs 15, 16, 17, 22, 32, 42.

Figure 3:
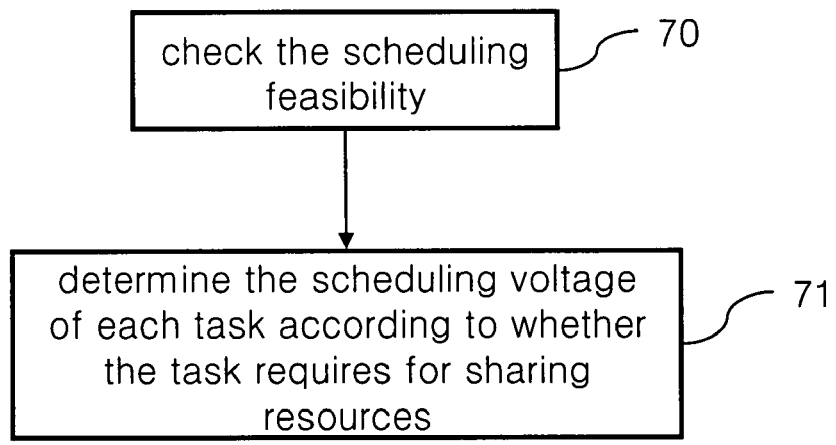
FIG. 3 is a flow chart of the dynamic voltage scheduling method according to the present invention.
Figure 4:
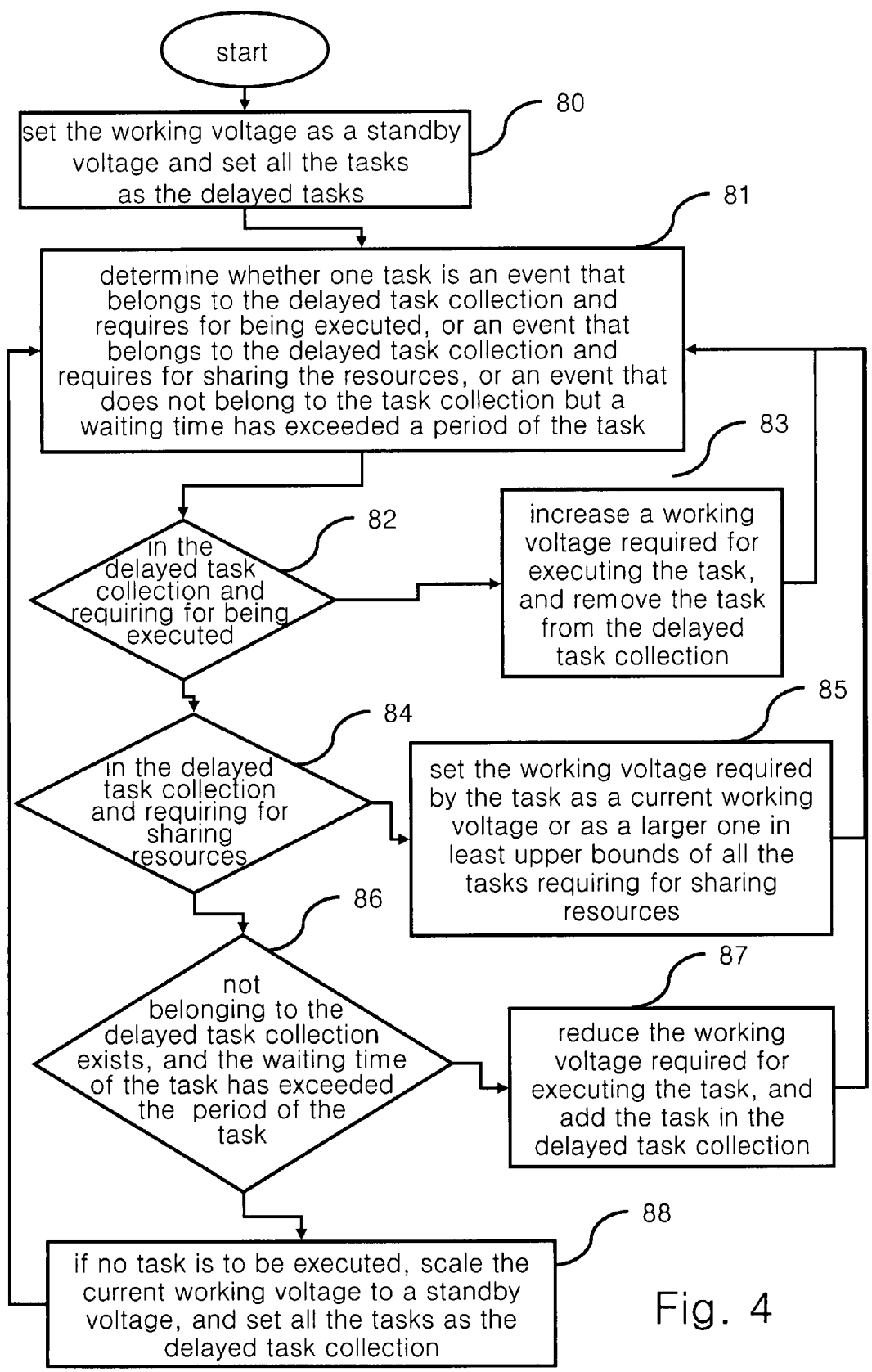
FIG. 4 is a flow chart of voltage scaling in the dynamic voltage scheduling method according to the present invention.

In the present invention, the feasible minimum voltage of each task is calculated according to the deadline required by the task and the software resource utilization. The executing process mainly includes checking a scheduling feasibility and calculating a scheduling voltage. Referring to FIG. 3, it is a flow chart of a dynamic voltage scheduling method according to the present invention.

Figure 2:
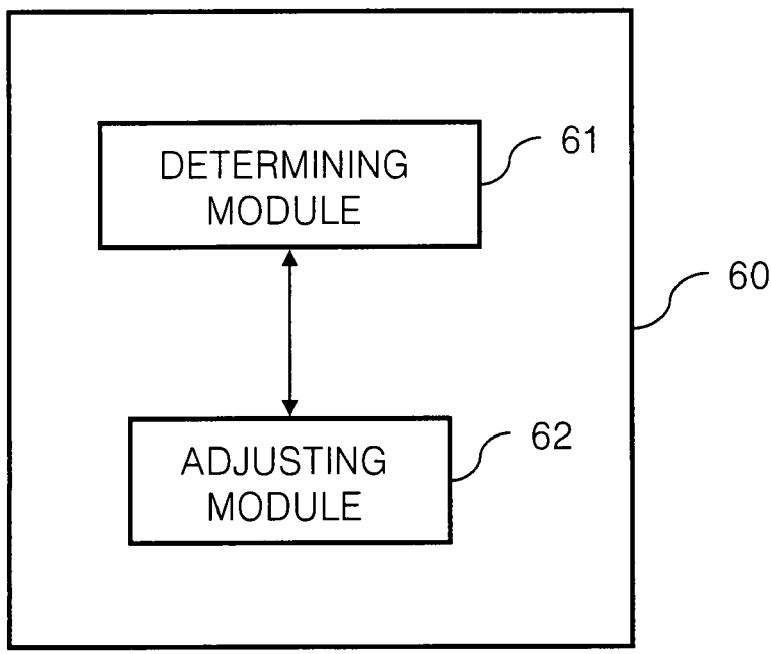
FIG. 2 is a block diagram of the dynamic voltage scaling scheduling system according to the present invention.

The method of FIG. 3 is executed by the CPU 60 of FIG. 1. As shown in FIG. 2, a determining module 61 and an adjusting module 62 are provided in the CPU 60 by way of software or hardware. The determining module 61 determines a property of a task according to task information offered by system software. The adjusting module 62 adjusts a working voltage required for executing the task either when the task belongs to the delayed task set or when the task does not belong to the task collection but a waiting time has exceeded a period of the task. When one task in the delayed task set requires for being executed, the adjusting module 62 increases a working voltage required for executing the task, removing the task from the delayed task set. When one task in the delayed task set requires for sharing resources, the adjusting module 62 sets the working voltage required by the task as a current working voltage or as a larger one in least upper bounds of all tasks requiring for sharing resources. When one task not belonging to the delayed task set exists, and the waiting time of the task has exceeded the period of the task, the adjusting module 62 reduces the working voltage required for executing the task, adding the task in the delayed task set.

First, the scheduling feasibility is checked (Step 70), and if the feasibility of scheduling is confirmed, the scheduling voltage of each task is determined according to whether the task requires for sharing resources (Step 71).

Considering that the task collection in the system is $T=\{T_1, T_2, \ldots, T_n\}$, and the period of the task $T_i$ is an increasing subsequence $\{P_i\}$, that is, if i>j, $P_i \geq P_j$, wherein $P_i$ is the period of $T_i$. In addition, the task collection T shares m different software resources, $R=\{R1, R2, \ldots, Rn\}$. The executing time required by $T_i$ is $e_i$. The check of the scheduling feasibility is to check the system utilization and to ensure that the tasks sharing the resources have feasible scheduling conditions.

The system utilization calculates whether the utilization for finishing all the tasks will not exceed 1, i.e., $$\sum_{i=1}^{n} \frac{e_i}{P_i} \leq 1,$$

so as to ensure that the CPU is not overloaded.

The check of the feasibility for tasks sharing the resources is achieved through Equation $$\frac{e_i + \sum_{j=1}^{i-1} \lfloor \frac{L}{P_i} \rfloor e_j}{L} + \sum_{j=i+1}^{n} \frac{e_j}{p_j} < 1, \text{ for } \forall i,$$

$$1 < i \leq n \wedge (r_i \neq 0) \wedge (T_i \neq TD) \forall L \cdot P_{ri} < P_i,$$

so as to ensure that the tasks sharing the resources have the feasible scheduling.

After finishing checking the scheduling feasibility, if the scheduling feasibility comes to be true, the scheduling voltage of each task is determined according to the following events, with reference to FIG. 3.

When determining the scheduling voltage of each task, initial conditions are set first (Step 80), wherein the working voltage is set as a standby voltage of the system, and all the tasks $T=\{T_1, T_2, \ldots, T_n\}$ are set as the delayed task set TD.

Next, it is determined whether one task is an event that belongs to the delayed task set and requires for being executed, or an event that belongs to the delayed task set and requires for sharing the resources, or an event that does not belong to the task collection but a waiting time has exceeded a period of the task (Step 81).

Then, if the task $T_i$ of the delayed task set TD requires for being executed (Step 82), the working voltage of the task $T_i$ is increased, and the task $T_i$ is removed from the delayed task set TD (Step 83), and it returns to Step 81. The scaling volume of the working voltage is $$\alpha_{DVSST} = \alpha_{DVSST} + \frac{e_i}{P_i},$$

wherein $\alpha_{DVSST}$ indicates the current working voltage, $e_i$ indicates the time required for executing the task, and $P_i$ indicates the period of the task.

If the task $T_i$ of the delayed task set TD requires for sharing the resources (Step 84), the working voltage is set as the current working voltage or a larger one of least upper bounds of the tasks requiring for sharing the resources (Step 85), and it returns to Step 81.

The least upper bounds of all the tasks requiring for sharing the resources are determined through the following steps. If the last task requiring for sharing the resources is $T_i$, the working voltages required by the tasks with a period less than the period of $T_i$ are calculated through Equation $$\alpha_{ST}(i, L) = \frac{e_i + \sum_{j=1}^{i-1} \left\lfloor \frac{L-1}{p_j} \right\rfloor e_j}{L}, P_{r_i} < L < p_i.$$

After all the possible working voltages are calculated, a minimum working voltage is derived as $$H_{ST}(i) = \min_{P_{r_i} < L < p_i} (\alpha_{ST}(i, L)),$$

then, the least upper bounds are obtained from, $\alpha_{lub}(i) = H_{ST}(i) + \alpha_{LT}(i)$, and finally the largest one in the least upper bounds is found out $$H_{lub} = \max_{\substack{1 \leq i \leq n \\ r_i \neq 0 \land T_i \notin TD}} (\alpha_{lub}(i)).$$

If the task is scheduled in the delayed task set TD, after Step 82 and Step 84, the working voltage is determined, and the task is sent to the EDF 50 for being executed. If the task waiting for being executed does not belong to the delayed task set TD but belong to an non-periodic task, and the waiting time has exceeded the period of the task (Step 86), the working voltage of the non-periodic task is reduced, and the non-periodic task is added in the delayed task set TD (Step 87), and it returns to Step 81. The scaling volume of the working voltage $$\alpha_{DVSST} = \alpha_{DVSST} - \frac{e_i}{P_i},$$

wherein $\alpha_{DVSST}$ indicates the current working voltage, $e_i$ indicates the time required for executing the task, and $P_i$ indicates the period of the task.

After the determination process through Steps 82, 84, and 86, if there is no task to be executed, the scheduling voltage is scaled back to the standby voltage and all the tasks are listed in the delayed task set TD (Step 88), and the method returns to Step 81.

The dynamic voltage scaling scheduling method disclosed in the present invention not only can be applied in the scheduling architecture in FIG. 1, but also be applied in a recording medium, and when the recording medium is executed by a computer system, the steps described above are executed.

The above mentioned flow is illustrated below through an embodiment.

As for a task collection $\tau=\{T_1, T_2, T_3, T_4\}$, all the tasks in the collection are ordered according to the increasing of the period, that is, as for any two tasks $T_i$ and $T_j$, if $i \geq j$, $p_i \geq p_j$. The task collection can share a unit resource collection $R=\{R_1\}$ with a reusable sequence. A parameter of this task is $T_i=((e_i, r_i), p_i)$, wherein $e_i$ indicates the executing time of the task $T_i$ under the worst condition, $r_i$ indicates the resource requirement, and $p_i$ indicates the period.

In this embodiment, the information of the used tasks in the task collection is described as follows.

$T_1=((1,1), 4), T_2=((3,0), 10), T_3=((3,1), 20), T_4=((2,0), 30),$ and it is assumed that Task $T_1$ is released at Time 1, Task $T_2$ is released at Time 1, Task $T_3$ is released at Time 0, and Task $T_4$ is released at Time 1.

Assuming that the unit of time is 1 ms, and the current time is 5. Before scheduling the task collection, the feasible conditions of the scheduling is first confirmed, and the system utilization is calculated. According to the above conditions, the system utilization is $1/4+3/10+3/20+2/30=0.767$. Therefore, the system utilization is less than 1, and thus satisfying the scheduling feasibility requirement.

In this embodiment, $r_1=1$, $r_3=1$, and thus Task $T_1$ and Task $T_3$ share the same resource.

In this embodiment, when $r_1=1$, $r_3=1$, that is, Task $T_1$ and Task $T_3$ share the same resource, the values of all $\alpha_{ST}(3,L)$ in the interval $[P_1+1, p_3]$ are calculated. Since the minimum period $P_1$ is equal to 4, the interval $[P_1+1, p_3]$ is equal to the interval [5,20]. The Equation of $\alpha_{ST}(3,L)$ is shown as follows.

$$\alpha_{ST}(3,L) = \frac{3 + \left\lfloor \frac{L-1}{4} \right\rfloor + \left\lfloor \frac{L-1}{10} \right\rfloor}{L}, \text{ for } 5 < L < 20.$$

Assuming that the current time is 5 ms, the value of $\alpha_{ST}(3, 5)$ is:

$$\alpha_{ST}(3,5) = \frac{3 + \left\lfloor \frac{5-1}{4} \right\rfloor + \left\lfloor \frac{5-1}{10} \right\rfloor}{5} = 0.8.$$

The maximum value of $\alpha_{ST}(3,L)$ in the time interval [5, 20] is $H_{st}(3)$. The value obtained by adding $H_{st}(3)$ with $\alpha_{st}(3,L)$ is the least upper bound of $T_3$, also known as $\alpha_{lub}(3)$.

Then, $H_{lub} = \max_{\substack{1 \leq i \leq 4 \\ r_i \neq 0 \land T_1 \notin TD}} (\alpha_{lub}(i)) = \alpha_{lub}(3) = 0.733.$ Therefore, under the condition that the system utilization is $1/4+3/10+3/20+2/30=0.767$, as the scaled working voltage must meet the real-time and resource sharing requirements, the value of the scaled working voltage must be the larger value of the least upper bound $H_{lub}$ and the current working voltage. Therefore, the following result is obtained, $$\alpha_{DVSSR}=\text{Max}(\alpha_{DVSST}, H_{lub})=\text{Max}(0.767, 0.773)=0.773.$$

Figure 5:
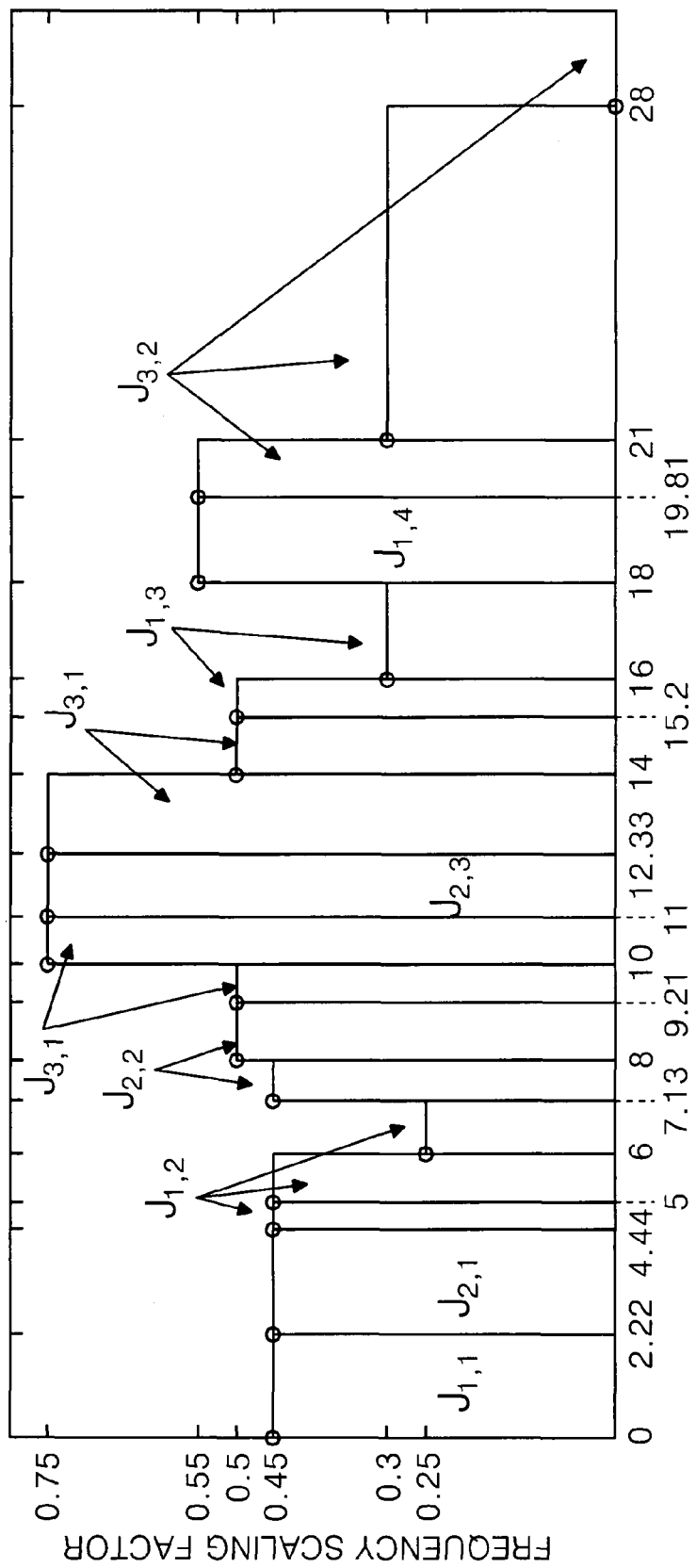
FIG. 5 shows the scheduling process according to the prior art.
Figure 6:
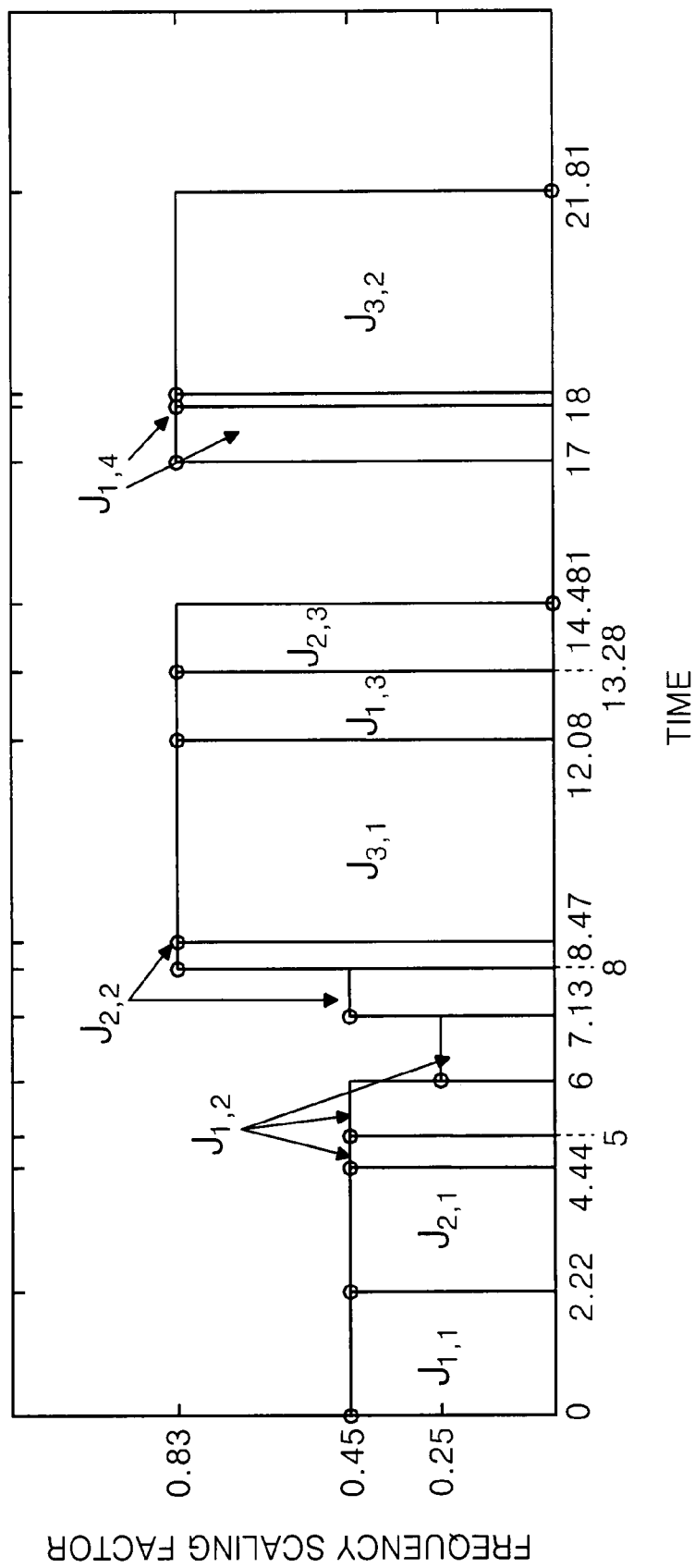
FIG. 6 shows the dynamic voltage scheduling process according to the present invention.

In order to verify the above method, referring to FIG. 5 and FIG. 6, FIG. 5 is a result of the prior art of dynamic voltage scheduling without considering resource-sharing, and FIG. 6 is a result obtained from the present invention considering resource-sharing. Now, the task collections: $T_1=((1,1),4)$, $T_2=((1,0),5)$, $T_3=((3,1),10)$ are taken into consideration.

After calculation, the system utilization before voltage scaling is U=0.75, which meets the requirement of scheduling feasibility, and the scheduling can be finished. $J_{i,j}$ represents $j^{th}$ release of Task i, the transverse axis represents the time, and the vertical axis represents the frequency (voltage) for executing the task. The areas under the lines represent the consumed energy. Therefore, the energy saving performances of different scheduling methods can be seen from the figure.

The method disclosed according to the present invention calculates the optimum start/end time and the minimum executing voltage of a task to be executed according to the properties of the task, including real-time property and periodic property, so as to achieve the requirements of real-time and energy saving. Moreover, the method disclosed in the present invention also takes the resource sharing factor into consideration during scheduling, such that the scheduling of tasks has more flexibility, and the real-time requirement for periodic and sporadic tasks is ensured, thereby significantly improving the energy saving performance of the current mechanism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic voltage scaling scheduling method for resource-sharing and hard real-time tasks, applicable for scheduling tasks in a delayed task set, comprising:
    determining a property of a task, and executing one of the following steps, when the task belongs to the delayed task set, or the task does not belong to the delayed task set but a waiting time has exceeded a period of the task:
        when one task in the delayed task set requires for being executed, increasing a working voltage required for executing the task, removing the task from the delayed task set, and returning to the step of determining the property of the task;
        when one task in the delayed task set requires for sharing resources, setting the working voltage required by the task as a current working voltage or as a larger one in least upper bounds of all tasks requiring for sharing resources, and returning to the step of determining the property of the task; and
        when one task not belonging to the delayed task set exists, and the waiting time of the task has exceeded the period of the task, reducing the working voltage required for executing the task, adding the task in the delayed task set, and returning to the step of determining the property of the task.

2. The dynamic voltage scaling scheduling method as claimed in claim 1, wherein the method is executed under a circumstance that a system utilization does not exceed 1, and the system utilization is $$\sum_{i=1}^{n} \frac{e_i}{P_i} \leq 1,$$

wherein $e_i$ indicates the time required for executing the task, and Pi indicates the period of the task.

3. The dynamic voltage scaling scheduling method as claimed in claim 1, wherein before the step of determining the property of the task, the method further comprises a step of setting the working voltage as a standby voltage of the system, and setting all the tasks as the delayed task set.

4. The dynamic voltage scaling scheduling method as claimed in claim 1, wherein after the step of reducing the working voltage required for executing the task, if no task is to be executed, the current working voltage is scaled to a standby voltage and all the tasks are set as the delayed task set, and the method returns to the step of determining the property of the task.

5. The dynamic voltage scaling scheduling method as claimed in claim 1, wherein in the step of increasing the working voltage required for executing the task, the increased voltage is $$\alpha_{DVSST} + \frac{e_i}{P_i},$$

wherein $\alpha_{DVSST}$ indicates the current working voltage, $e_i$ indicates the time required for executing task i, and Pi indicates the period of task i.

6. The dynamic voltage scaling scheduling method as claimed in claim 1, wherein in the step of reducing the working voltage required for executing the task, the reduced voltage is $$\alpha_{DVSST} = \alpha_{DVSST} - \frac{e_i}{P_i},$$

wherein $\alpha_{DVSST}$ indicates the current working voltage, ei indicates the time required for executing task i, and Pi indicates the period of task i.

7. A non-transitory recording medium containing computer program code embodied therewith and applicable being executed to schedule tasks in a delayed task set, the computer program code comprising:
    instructions to determine a property of a task, and to execute one of the following steps, when the task belongs to the delayed task set, or the task does not belong to the delayed task set but a waiting time has exceeded a period of the task:
        when one task in the delayed task set requires for being executed, increasing a working voltage required for executing the task, removing the task from the delayed task set, and returning to the step of determining the property of the task;
        when one task in the delayed task set requires for sharing resources, setting the working voltage required by the task as a current working voltage or as a larger one in minimum upper bounds of all the tasks requiring for sharing resources, and returning to the step of determining the property of the task; and
        when one task not belonging to the delayed task set exists, and the waiting time of the task has exceeded the period of the task, reducing the working voltage required for executing the task, adding the task in the delayed task set, and returning to the step of determining the property of the task.

8. The recording medium as claimed in claim 7, wherein the method is executed under a circumstance that a system utilization does not exceed 1, and the system utilization is $$\sum_{i=1}^{n} \frac{e_i}{P_i} \leq 1,$$

wherein ei indicates the time required for executing task i, and Pi indicates the period of task i.

9. The recording medium as claimed in claim 7, wherein before the step of determining the property of the task, the method further comprises a step of setting the working voltage as a standby voltage of the system, and setting all the tasks as the delayed task set.

10. The recording medium as claimed in claim 7, wherein after the step of reducing the working voltage required for executing the task, if no task is to be executed, the current working voltage is scaled to a standby voltage and all the tasks are set as the delayed task set, and the method returns to the step of determining the property of the task.

11. The recording medium as claimed in claim 7, wherein in the step of increasing the working voltage required for executing the task, the increased voltage is $$\alpha_{DVSST} + \frac{e_i}{P_i},$$

wherein $\alpha_{DVSST}$ indicates the current working voltage, $e_i$ indicates the time required for executing the task, and Pi indicates the period of the task.

12. The recording medium as claimed in claim 7, wherein in the step of reducing the working voltage required for executing the task, the reduced voltage is $$\alpha_{DVSST} = \alpha_{DVSST} - \frac{e_i}{P_i},$$

wherein $\alpha_{DVSST}$ indicates the current working voltage, $e_i$ indicates the time required for executing the task, and $P_i$ indicates the period of the task.

13. A dynamic voltage scaling scheduling system, for scheduling tasks in a delayed task set, comprises:
   means for determining a property of a task; and
   means for adjusting of a working voltage required for executing the task when the task belongs to the delayed task set, or the task does not belong to the delayed task set but a waiting time has exceeded a period of the task,
   wherein when one task in the delayed task set requires for being executed, increasing a working voltage required for executing the task, removing the task from the delayed task set;
   wherein when one task in the delayed task set requires for sharing resources, setting the working voltage required by the task as a current working voltage or as a larger one in least upper bounds of all tasks requiring for sharing resources; and
   wherein when one task not belonging to the delayed task set exists, and the waiting time of the task has exceeded the period of the task, reducing the working voltage required for executing the task, adding the task in the delayed task set.

14. The dynamic voltage scaling scheduling system as claimed in claim 13, wherein the scheduling is executed under a circumstance that a system utilization does not exceed 1, and the system utilization is $$\sum_{i=1}^{n} \frac{e_i}{P_i} \leq 1,$$

wherein ei indicates the time required for executing the task, and Pi indicates the period of the task.

15. The dynamic voltage scaling scheduling system as claimed in claim 13, wherein before determining the property of the task, the means for determining further setting the working voltage as a standby voltage of the system, and setting all the tasks as the delayed task set.

16. The dynamic voltage scaling scheduling system as claimed in claim 13, wherein if no task is to be executed, the means for adjusting adjusts the current working voltage to a standby voltage and sets all the tasks are as the delayed task set.

17. The dynamic voltage scaling scheduling system as claimed in claim 13, wherein the increased voltage is $$\alpha_{DVSST} + \frac{e_i}{P_i},$$

wherein $\alpha_{DVSST}$ indicates the current working voltage, $e_i$ indicates the time required for executing the task, and Pi indicates the period of the task.

18. The dynamic voltage scaling scheduling system as claimed in claim 13, wherein the reduced voltage is $$\alpha_{DVSST} = \alpha_{DVSST} - \frac{e_i}{P_i},$$

wherein $\alpha_{DVSST}$ indicates the current working voltage, $e_i$ indicates the time required for executing task i, and Pi indicates the period of task i.

* * * * *